(12) United States Patent
Gorenflo (10) Patent No.: US 7,721,845 B2
(45) Date of Patent: May 25, 2010

(54) EXHAUST MUFFLER

(75) Inventor: Ernst Gorenflo, Heinsheim (DE)

(73) Assignee: Dolmar GmbH, Hamburg (DE)

( * ) Notice: Subject to any disclaimer, the term of this patent is extended or adjusted under 35 U.S.C. 154(b) by 72 days.

(21) Appl. No.: 12/034,115

(22) Filed: Feb. 20, 2008

(65) Prior Publication Data

US 2008/0135331 A1    Jun. 12, 2008

Related U.S. Application Data

(63) Continuation-in-part of application No. 11/034,387, filed on Jan. 11, 2005, now abandoned.

(30) Foreign Application Priority Data

Jan. 12, 2004    (DE) .................. 20 2004 000 375 U (51) Int. Cl.
*F01N 1/12* (2006.01)
(52) U.S. Cl. ...................... 181/281; 181/279
(58) Field of Classification Search .............. 181/240, 181/278, 279, 280, 281
See application file for complete search history.

(56) References Cited

U.S. PATENT DOCUMENTS

| | | | | |
|---|---|---|---|---|
| 1,713,047 A | * | 5/1929 | Maxim | 60/314 |
| 3,066,755 A | * | 12/1962 | Diehl | 181/279 |
| 4,142,607 A | * | 3/1979 | Landwehr et al. | 181/259 |
| 4,164,989 A | * | 8/1979 | Lux et al. | 181/265 |
| 4,165,798 A | * | 8/1979 | Martinez | 181/268 |
| 4,846,301 A | * | 7/1989 | Granath et al. | 181/230 |
| 4,890,690 A | | 1/1990 | Fischer et al. | |
| 5,014,816 A | * | 5/1991 | Dear et al. | 181/229 |
| 5,440,083 A | | 8/1995 | Masuda | |
| 5,996,732 A | | 12/1999 | Burger et al. | |
| 6,009,705 A | * | 1/2000 | Arnott et al. | 60/312 |
| 6,164,066 A | * | 12/2000 | Sakaguchi et al. | 60/302 |
| 6,250,075 B1 | * | 6/2001 | Funakoshi et al. | 60/299 |
| 6,250,422 B1 | * | 6/2001 | Goplen et al. | 181/272 |
| 6,305,493 B1 | * | 10/2001 | Laimbock | 181/230 |
| 2003/0085072 A1 | * | 5/2003 | Mukaida | 181/272 |

(Continued)

FOREIGN PATENT DOCUMENTS

DE    7925614 U1    5/1980

(Continued)

*Primary Examiner*—Jeffrey Donels
*Assistant Examiner*—Jeremy Luks
(74) *Attorney, Agent, or Firm*—Kelly Lowry & Kelley, LLP (57) ABSTRACT

In order to provide an exhaust muffler for an internal combustion engine, especially a portable implement, comprising a catalyst which is arranged in a housing which has at least one inlet opening and one outlet opening for exhaust gas flowing out from the internal combustion engine into the environment, in which the temperature of the exhaust gas in the area of the outlet into the environment is reduced substantially and/or a sufficiently long path length is made available so that flame development can be avoided especially in the outlet area of the exhaust muffler, it is proposed that the outlet opening has at least one means through which exhaust gas flows, which is arranged partially outside the housing and has an outlet facing the environment, whereby the flow path of the exhaust gas in the direction of the environment is lengthened.

18 Claims, 6 Drawing Sheets

U.S. PATENT DOCUMENTS

2003/0173148 A1 * 9/2003 Andersson et al. .......... 181/272

FOREIGN PATENT DOCUMENTS

| | | | |
|---|---|---|---|
| DE | 3829668 | A1 | 6/1989 |
| DE | 19643191 | A1 | 4/1997 |
| DE | 19902915 | A1 | 7/1999 |
| DE | 19834822 | A1 | 2/2000 |

* cited by examiner

EXHAUST MUFFLER

BACKGROUND OF THE INVENTION

The invention relates to an exhaust muffler for an internal combustion engine, especially of a portable implement, comprising a catalyst which is arranged in a housing, which has at least one inlet opening and one outlet opening for an exhaust gas flowing from an internal combustion engine into an environment.

The exhaust gases from internal combustion engines generally enter the catalyst at an exhaust gas temperature of about 600° C. A chemical conversion of the exhaust gases takes place inside the catalyst. In this case, three processes take place simultaneously adjacent to one another: NOx is reduced to nitrogen, releasing oxygen, CO is oxidized to CO2 and HC compounds are oxidized to CO2 and H2O, consuming oxygen at the same time. As a result of the chemical conversion processes, the temperature of exhaust gas "converted" by the catalyst is increased to about 1000° C. When this heated exhaust gas emerges from the catalyst, there is a risk of afterburning if sufficient HC and O2 is present and the ignition temperature is exceeded.

This is especially disadvantageous in the case of portable implements since the operator of such an implement can be injured by flame formation or combustible materials located in the vicinity can be ignited.

Described from DE 79 25 614 U1 is an exhaust muffler which has an inlet space and an outlet space from which an exhaust gas is led away. In the area of the outlet a branched partial stream of cooling air is supplied to the exhaust gas stream, which is mixed with the exhaust gas at the outlet and provides for a reduction in temperature. It is disadvantageous however that a sufficient reduction in the temperature of the exhaust gas stream is not achieved in the area of the outlet.

Known in accordance with DE 1 98 34 822 A1 is an exhaust muffler which is mounted on an internal combustion engine of a hand-held implement. In this case, the exhaust muffler has a housing with a catalyst element which is positioned between an exhaust gas inlet and an exhaust gas outlet.

Furthermore, a first partial stream of the exhaust gas stream inflowing via the exhaust gas inlet is brought in contact with the catalyst element and a second partial stream flows substantially without contact with the catalyst element to the exhaust gas outlet. Before leaving the housing, the partial streams are brought together and mixed. In this case also no satisfactory reduction in the exhaust gas outlet temperature is achieved, whereby the afore-mentioned hazards could be avoided.

DE 38 29 668 C3 proposes an exhaust gas muffler in which a catalyst is arranged with a spacing on all sides [inside] a housing of the exhaust gas muffler, wherein the converted exhaust gas is led out of the catalyst to the outlet through an exhaust gas end pipe, wherein the exhaust gas end pipe lies inside the muffler housing over most of its length with spacing on all sides and is flushed with untreated exhaust gas, and the treated exhaust gas is led away from the muffler housing into the ambient air through a starting section of the exhaust gas end pipe. This cooling of the pipe behind the catalyst inside the muffler is inferior to the additional cooling by ambient air and the muffler is expensive and costly to produce since the pipe must be made of stainless steel for example and there is a high degree of forming. In addition, the proposed solution merely leads to short pipe lengths since the length must be realized inside the muffler.

SUMMARY OF THE INVENTION

It is the object of the invention to provide an exhaust muffler in which the temperature of the exhaust gas is reduced substantially in the area of the outlet into the environment and/or a sufficiently long path length is made available so that flame development can be avoided especially in the outlet area of the exhaust muffler.

In order to solve this object, a device having the features of claim 1 is proposed. Preferred further developments of the exhaust muffler according to the invention are specified in the dependent claims.

For this purpose, it is provided according to the invention that the outlet opening has at least one means arranged inside and/or outside the housing whereby the flow path of the exhaust gas in the direction of the environment is lengthened. The means through which exhaust gas flows and which comprises an outlet facing the environment, can for example, have a wall which is constructed as a labyrinth-shaped channel in which the heated exhaust gas flowing from the catalyst is guided. The flow path of the exhaust gas to the environment is lengthened by the labyrinth-shaped construction of the channel so that any emergence of flames from the exhaust muffler is largely avoided. Whilst the exhaust gas flows through the means, residual hydrocarbons can still be burnt (oxidized) in the exhaust gas. In addition, as a result of heat conduction, the exhaust gas stays along the wall so that no ignition of the exhaust gas occurs in the outlet (opening region) of the exhaust muffler. In this case, it is unimportant whether part of the lengthening of the flow path is arranged inside and/or outside the housing. In addition to avoiding any flame formation and reducing the exhaust gas temperature in the outlet region, the lifetime of the exhaust muffler is further increased by the arrangement according to the invention. In this case, the arrangement of the means outside the housing has the advantage that the ambient air has a cooling effect on the exhaust gas flowing inside the means. From the aesthetic point of view, an arrangement of the means inside the housing can be preferred.

In a further embodiment of the invention, the means can be constructed as a bent pipe. The pipe can, for example, have a spiral-shaped or helical profile, preferably with a plurality of turns or with straight sections approximately at right angles to one another. In the case of the helical pipe, the pipe can be bent in different directions. One of the advantages of spiral or helical pipes, especially in the arrangement with sections constructed approximately More appropriately, the means can have an outlet which has the form of a diffuser. The diffuser arrangement has the advantage that in the area of the outlet, thorough mixing of the cooler ambient air with the warmer exhaust gas flowing through the diffuser is favored, whereby a reduction in the exhaust gas temperature in the outlet region is achieved.

In a further alternative of the invention, the pipe is constructed with a plurality of openings. In this embodiment of the exhaust muffler, the pipe is preferably arranged outside the housing. The hot exhaust gas flows, for example, through the helical pipe, wherein an underpressure is formed from the flow technology point of view on the outside of the pipe in the area of the openings. Consequently, ambient air is sucked into the pipe through the openings so that the hot exhaust gas is mixed with the cooler ambient air inside the pipe and thus the exhaust gas temperature is further reduced in the outlet of the exhaust muffler. Thus, any flames formed in the exhaust gas can be extinguished.

The exhaust muffler according to the invention can have at least one bypass pipe which guides at least part of the exhaust gas flowing out of the internal combustion engine past the catalyst into the means. It is advantageous if non-converted "cold" exhaust gas is specifically brought together with the hot exhaust gas flowing out of the catalyst, which results in an appreciable reduction in the temperature of the exhaust gas in the opening area. The bypass pipe can for example be constructed as a pipe which has an exhaust gas inlet and an exhaust gas outlet wherein the exhaust gas inlet is preferably facing the inlet opening of the housing. The exhaust gas outlet is positioned behind the catalyst.

If the means according to the invention, for example, the helical pipe, is arranged outside the housing, it is advantageous that the exhaust muffler has a protective element extending above the pipe. This protective element serves as a type of contact protection and cooling air baffle plate which protects the user from the high temperatures of the pipe. To save weight, the protective element can be constructed as a perforated sheet. In this case, the protective element can be attached subsequently to the housing, for example, by means of a screw connection. In order that only minimal heat conduction takes place between the housing and the protective element, the protective element is preferably only affixed at a few points on the housing. Furthermore, the fixing points can have insulating elements which largely inhibit passage of heat. The insulating elements can, for example, be insulating spacers. The switching element can also be formed by the equipment cover/cover hood/air guiding hood or it can be affixed thereto.

In a further embodiment of the invention, a dividing wall can be provided in the housing so that a first and a second space is formed inside the housing. In this embodiment the catalyst is arranged on the dividing wall and represents the connection between the first and the second space. The dividing wall preferably has at least one bypass opening.

The exhaust gas on the one hand flows through the bypass opening from the first into the second space. On the other hand, a partial stream of the exhaust gas is guided through the catalyst in which the harmful components of the exhaust gas are converted. The hot exhaust gas emerging from the catalyst enters into the second space and mixes with the colder exhaust gas flowing into the second space through the bypass opening. The bypass opening further eliminates any throttle effect of the catalyst and any reduction in performance resulting therefrom.

Further advantages, features and details of the invention are obtained from the following description in which several embodiments of the invention are described in detail with reference to the drawings. In this case, the features mentioned in the claims and in the description can be important for the invention for themselves or in any combination.

DETAILED DESCRIPTION OF THE PREFERRED EMBODIMENTS

Figure 1:
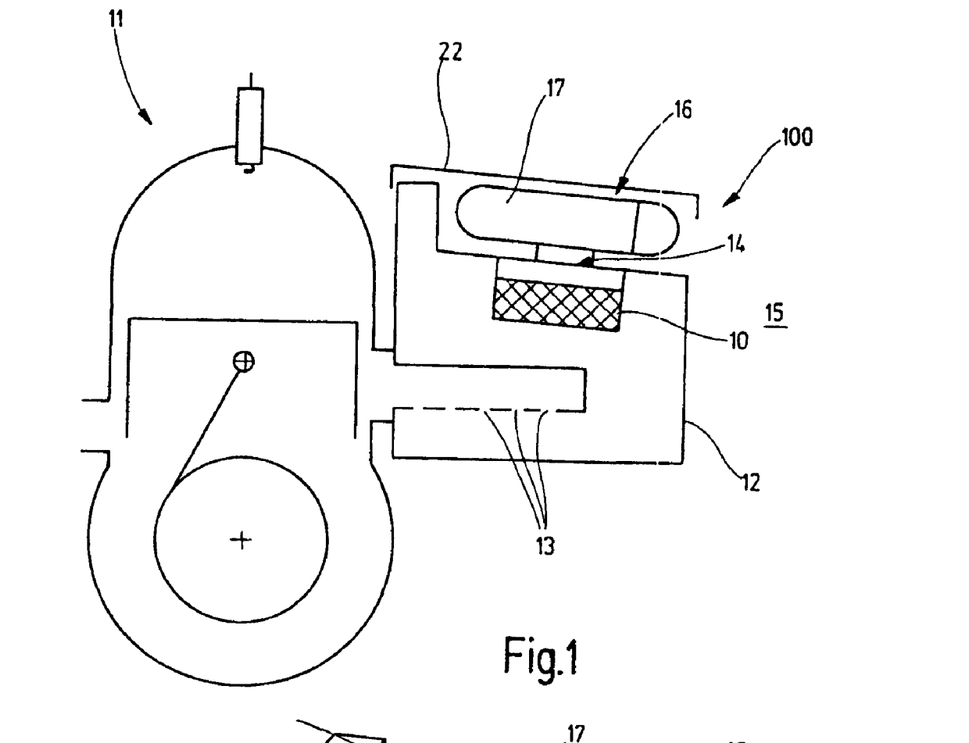
FIG. 1 is a sectional view of an exhaust muffler with an internal combustion engine.

FIG. 1 shows an exhaust muffler 100 with an internal combustion engine 11, which is a component of a hand-held tool which however is not shown, as an example. The tool can for example be a motor-driven chain saw, a disk grinder or the like. The exhaust muffler 100 has a housing 12 in which a catalyst 10 is arranged. Furthermore, the housing 12 is constructed with a plurality of inlet openings 13 through which exhaust gas is passed from the motor 11 into the exhaust muffler 100. The exhaust gas enters the housing 12 at a temperature of around 600° C. Inside the housing 12 the catalyst 10 converts the hydrocarbons contained in the exhaust gas large into carbon dioxide and water. The chemical conversion process involves an exothermic reaction process wherein the around 600° C hot exhaust gas from the motor 11 can be further heated to temperatures above 1000° C in the housing 12.

The housing 12 is further constructed with an outlet opening 14 through which the exhaust gas is guided from the housing 12. In this embodiment the catalyst 10 is arranged on an area of a housing wall which is constructed with the outlet opening 14. Outside the housing 12 in the area of the outlet opening 14, a means 16 in the form of a helical bent pipe 17 is arranged whereby the flow path of the exhaust gas in the direction of the environment 15 is lengthened (see FIG. 2). In this embodiment the pipe 17 has two ends, the first end facing the outlet opening 14.

Figure 2:
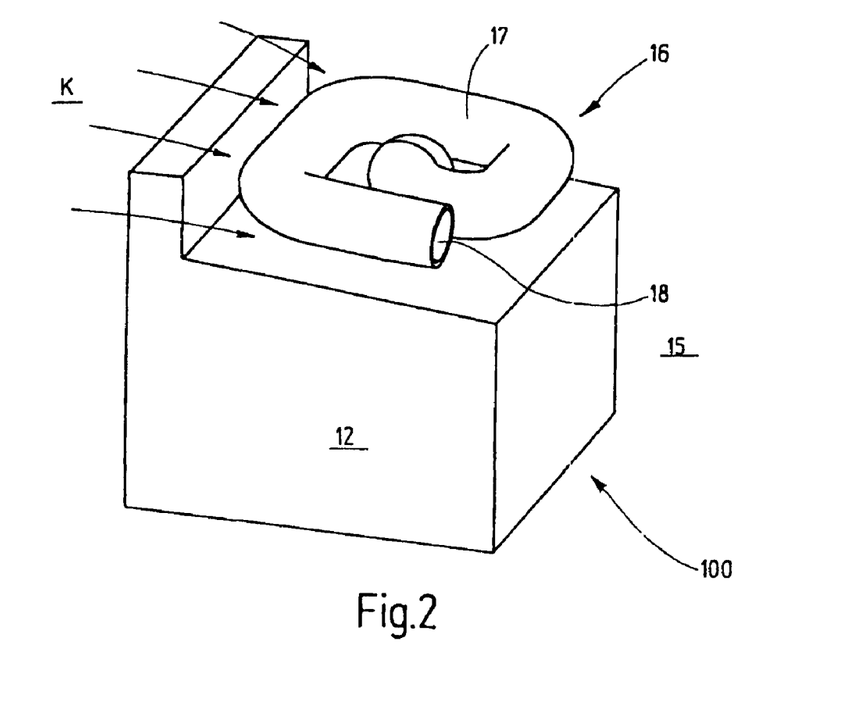
FIG. 2 is a perspective view of an exhaust muffler.

The second end is a free end through which the exhaust gas flows into the environment 15.

The converted exhaust gas emerging from the catalyst 10 flows through the outlet opening 14 and enters into the bent pipe 17. In the present embodiment the pipe 17 is bent at the first end in the direction of the housing wall.

Along the further profile the pipe 17 has a spiral profile and is constructed with an outlet opening 18 at the free end through which the exhaust gas enters the environment 15. As a result of the lengthened flow path, the hot exhaust gas is cooled along the pipe wall 17 so that any flame effect formed inside the pipe 17 is counteracted. As a result of such a simple arrangement, a significant reduction in the temperature of the exhaust gas leaving the exhaust muffler 100 or the bent pipe 17 is achieved. It is possible to arrange a spark arrester screen (not shown) in the area of the outlet opening 18.

Affixed above the pipe 17 is a protective element 22 (FIG. 1) which prevents the user from contacting the hot pipe 17 and the housing wall 12. In the present embodiment the protective element 22 is bent in a hood shape or U-shape and is affixed, for example, by means of a screw connection on the housing 12 which is not shown in the figures. The construction of the protective element not shown in FIG. 2 is such that incoming cooling air K is guided over the pipe wall 17 in order to additionally cool the pipe wall 17.

Figure 3:
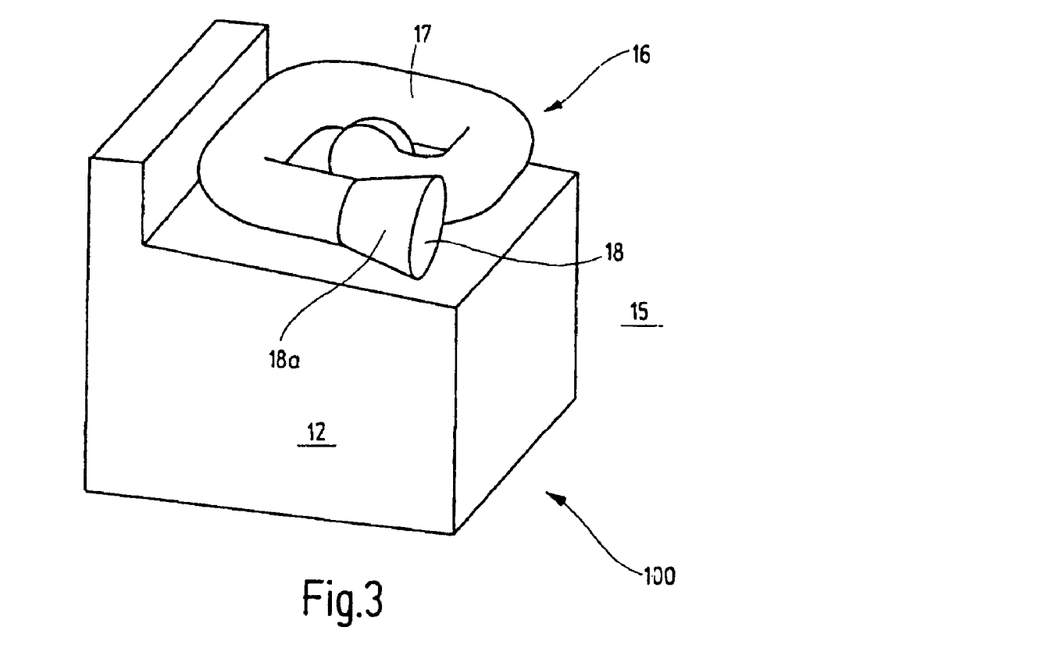
FIG. 3 is an exhaust muffler in an alternative embodiment.
Figure 4:
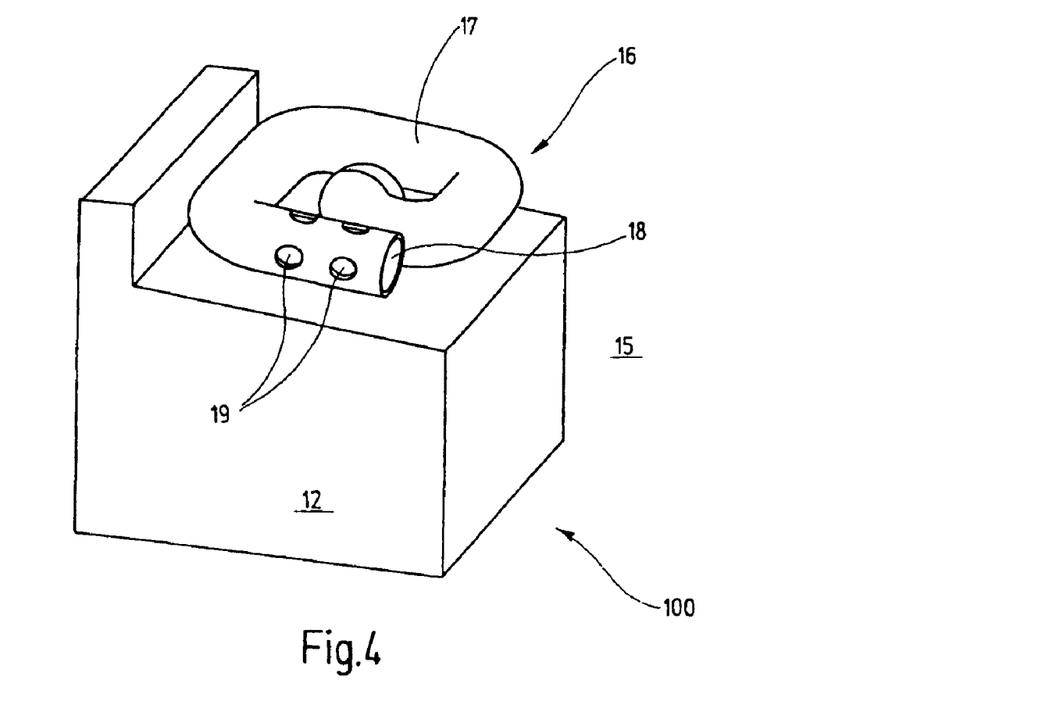
FIG. 4 is a further embodiment of the exhaust muffler.

FIGS. 3 and 4 show further alternative embodiments of the exhaust muffler 100. In FIG. 3 the outlet 18 has the form of a diffuser 18a. FIG. 4 shows a bent pipe 17 which has a plurality of openings 19 in the area of the free end. As a result of both alternative embodiments of the pipe 17 it is achieved that the exhaust gas temperature is reduced in the outlet 18 and flame formation is prevented as far as possible in the outlet region 18. Naturally it is also possible to combine the aforesaid alternatives one with another.

Figure 5:
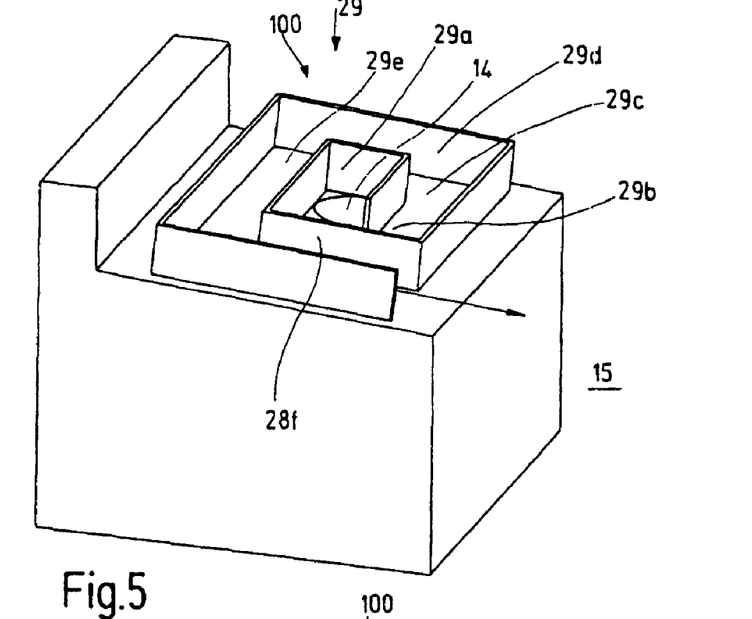
FIG. 5 is a further embodiment of the exhaust muffler.

In the embodiment of the exhaust muffler 100 shown in FIG. 5, a labyrinth-shaped channel 29, preferably constructed of a wall defined by longitudinal sections 29a-29f parallel to the side edges, is arranged at the outlet opening 14 in order to maximally lengthen the flow path of the exhaust gas in the direction of the environment within the space available. More particularly, as illustrated in FIG. 5, the wall 29 includes a plurality of angular bends along the length thereof, which are typically 90° so as to create the labyrinth-shaped exhaust outlet channel. The wall extends outwardly from the housing, and is of a lengthened path so as to cool the exhaust before it is finally emitted from an outlet of the channel. In this case, the channel is closed with a cover not shown in FIG. 5 in order to avoid short-circuiting flow into the environment.

Figure 6:
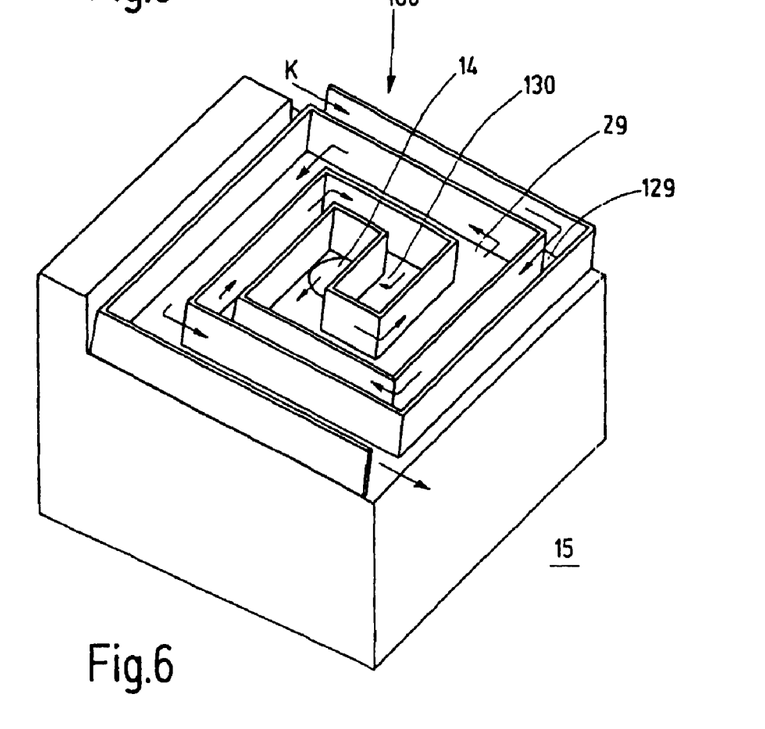
FIG. 6 is a further embodiment of the exhaust muffler.

It can also be provided to combine the channel 29 with a counterflow channel 129 to guide cooling air K through which the cooling air K is guided along on the walls of the channel 29. This embodiment is shown in FIG. 6. That is, a second wall extends outwardly from the housing in generally spaced relation to the first wall, the second wall defining the ambient air passageway 129 for cooling the exhaust gas passing through the exhaust outlet channel. Once again, the second wall includes a plurality of angular bends, typically 90° bends, along the length thereof such that sections of the wall are generally parallel to one another. It must then be provided that in the area of the channel end 130 a corresponding outlet opening is provided for the cooling air K in the cover not shown.

Figure 7:
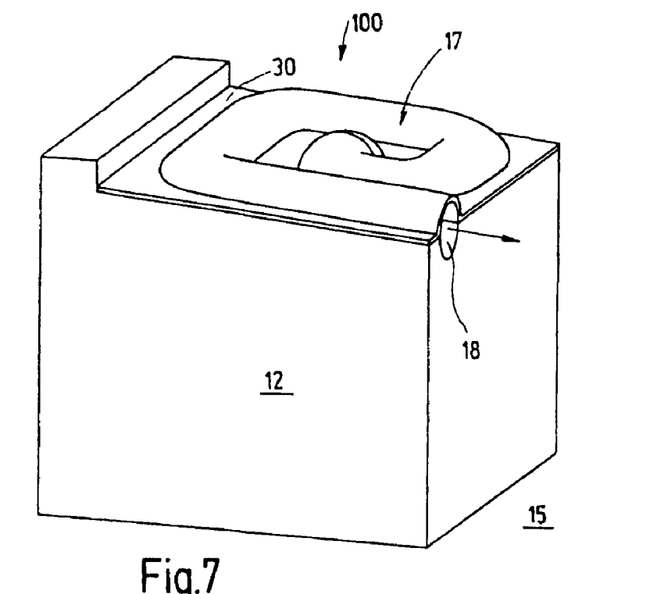
FIG. 7 is a further embodiment of the exhaust muffler.
Figure 8:
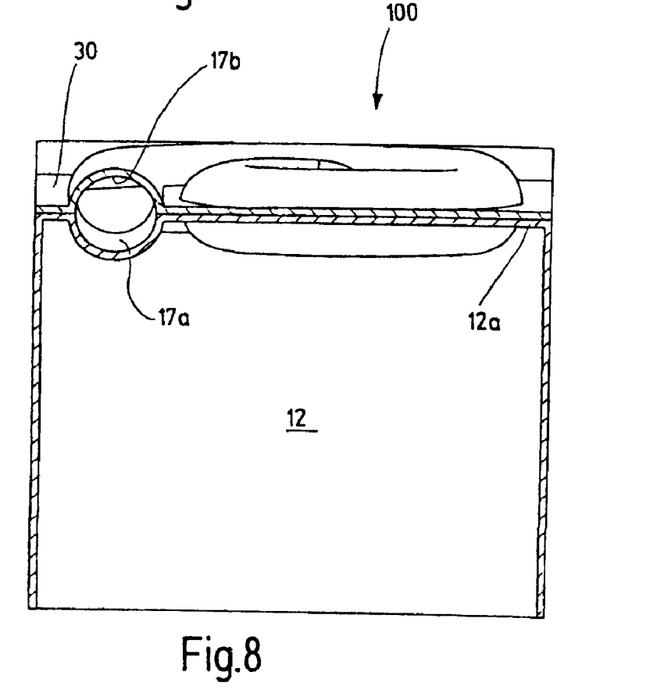
FIG. 8 is a perpendicular sectional view of the exhaust muffler from FIG. 7.

FIGS. 7 and 8 show a further embodiment of the exhaust muffler 100 whose fundamental construction corresponds to the embodiment according to FIG. 2 wherein the bent pipe 17 is constructed by constructing the housing 12a in the area of the outlet opening 14 as a half-shell in which a channel with a hemispherical cross-section 17a is stamped to form the pipe 17. Placed hereon is a cover sheet 30 in which a corresponding channel 17b having a likewise hemispherical cross-section is stamped so that overall the pipe 17 is formed which also has two ends, the first end overlapping into the outlet opening 14 not shown in FIGS. 7 and 8 and the other end being a free end through which the exhaust gas 15 flows into the environment. This embodiment has the advantage that the construction of the pipe 17 is relatively simple from the production technology point of view in that the desired shape of the pipe 17 is simply stamped into the top 12a as a channel 17a having a hemispherical or another desired cross section and especially the easily shaped arbitrary profile and the cover sheet 30 is placed thereon as a half-shell having a corresponding profile of the channel 17b to form the pipe 17. In this embodiment it is also appropriate to provide a protective element not shown in FIGS. 7 and 8 to avoid direct contact of the pipe 17 or the cover sheet 30 wherein it is advantageously also possible here to use this an air baffle plate for the guidance of cooling so that even more effective cooling of the exhaust gas is possible between the outlet opening 14 and the outlet 18 into the environment 15.

Figure 9:
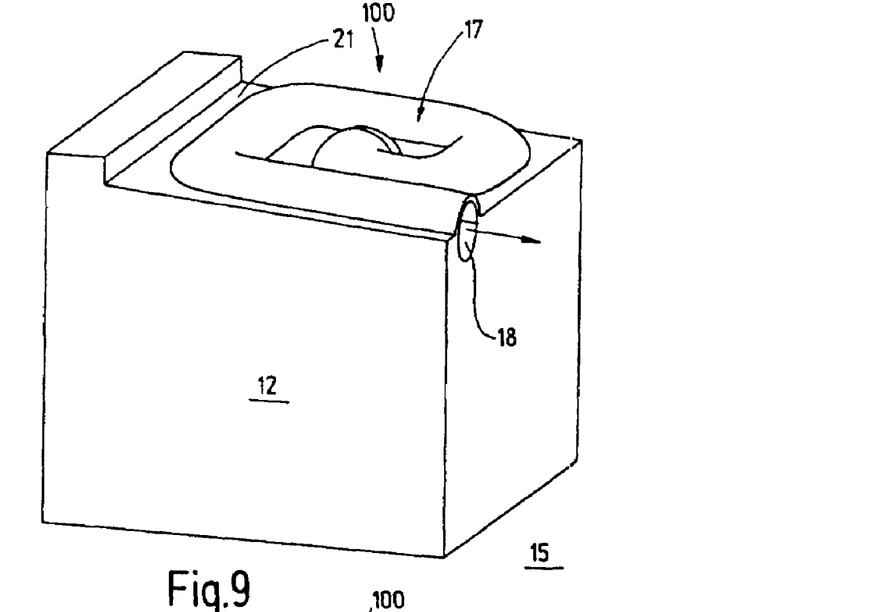
FIG. 9 is a further embodiment of the exhaust muffler.
Figure 10:
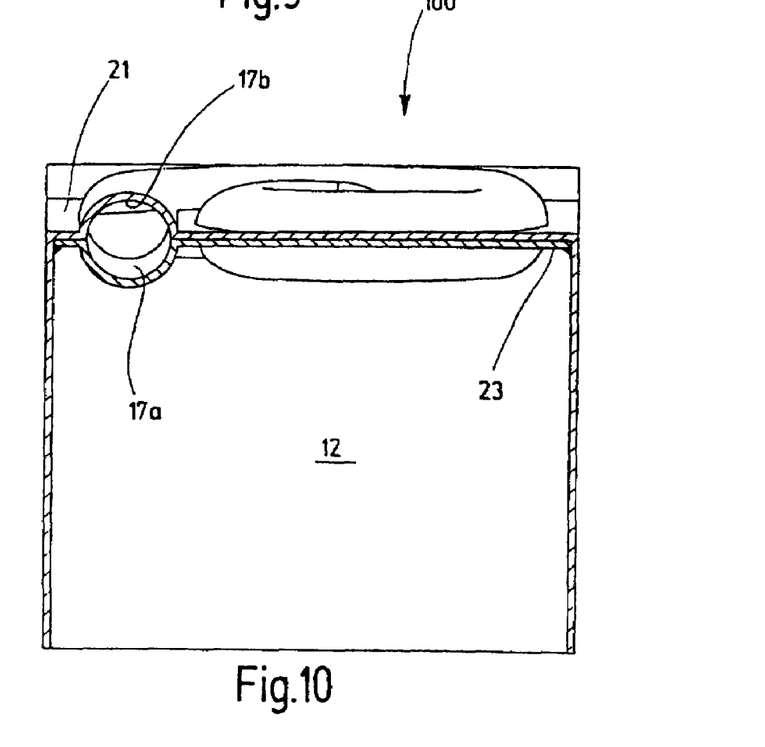
FIG. 10 is a further embodiment of the exhaust muffler, a perpendicular sectional view of the exhaust muffler from FIG. 9.

Compared with the embodiment shown in FIGS. 7 and 8, the embodiment shown in FIGS. 9 and 10 is shaped such that the muffler outer shell 21 is stamped outwards and the counterpiece 23 which then forms the channel together with the first stamping is incorporated in the muffler. The advantage is that gas leaks at the joints remain in the muffler. The counterpiece 23 can be welded in, clamped in or affixed in another suitable fashion. In this case, it is also feasible that the stamping of the housing wall and pipe shape is as in FIG. 1. An advantage is that complete flow of cooling air around the pipe and a small overall height of the total muffler is achieved if the pipe is attached at sufficient distance from the stamping of the housing wall.

Figure 11:
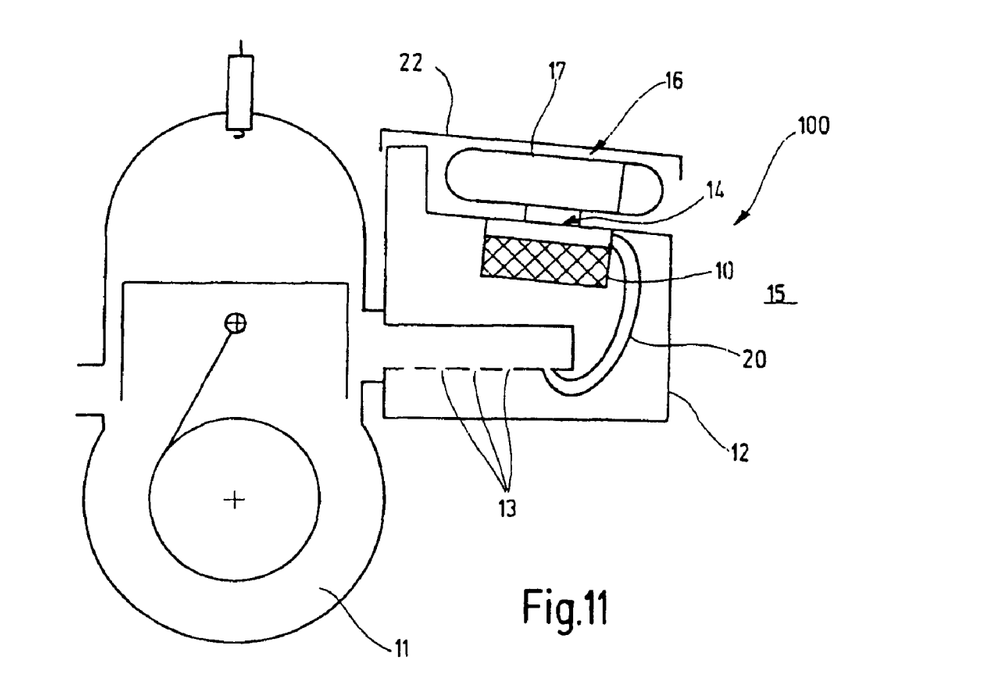
FIG. 11 is a sectional view of a further embodiment of the exhaust muffler with a bypass pipe.

FIG. 11 shows the exhaust muffler 100 from FIG. 1 wherein a bypass pipe 20 is additionally arranged inside the housing 12. The bypass pipe 20 extends from the inlet opening 13 to the outlet opening 14 of the housing 12. As a result of this embodiment some of the non-converted exhaust gas flowing from the motor 11 is specifically guided past the catalyst 10 and mixed with the exhaust gas emerging from the catalyst 10 in the area of the outlet opening 14 of the housing 12. The non-converted cool exhaust gas reduces the temperature of the treated exhaust gas flowing out of the catalyst 10 so that any flames formed can be extinguished by the cold exhaust gas.

Figure 12:
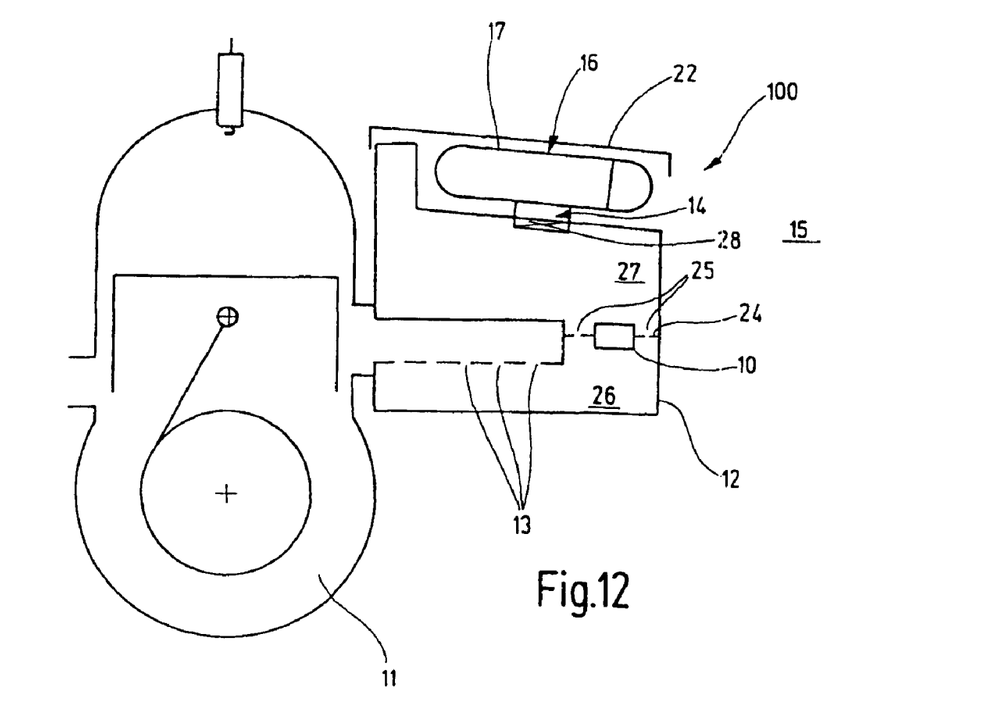
FIG. 12 is a sectional view of a further embodiment of an exhaust muffler.

In FIG. 12 a dividing wall 24 is arranged inside the housing 12 so that a first and a second space 26, 27 are formed in the housing 12. In contrast to the exemplary embodiment according to FIG. 1 or 5 the catalyst 10 is affixed to the dividing wall 24 which forms a connection between the first and the second space 26, 27. The catalyst 10 is arranged in an opening of the dividing wall 24 and is externally connected all the way round to the dividing wall 24 by means of a welded seam so that a gas-tight closure is provided. Naturally the catalyst 10 can be fixed to the dividing wall 24 by other known fixing alternatives. Among other things, it is achieved by the dividing wall 24 that the hot exhaust gas emerging from the catalyst 10 can no longer enter into the area of the inlet opening 13 of the housing 12 so that ignition of the overheated exhaust gas from the catalyst 10 which still has energy-rich constituents as a result of incomplete conversion, is prevented at the inlet opening 13.

Arranged laterally at a distance from the catalyst 10 are bypass holes 25 in the dividing wall 24 through which the exhaust gas can flow from the first space 26 into the second space 27. The partial streams which flow through the bypass holes 25 are not converted by the catalyst 10. In the second space 27 the exhaust gases which flow from the catalyst 10 and from the bypass holes 25 are thoroughly mixed. As in the exemplary embodiment according to FIG. 5, the exhaust gas located behind the catalyst 10 is cooled by the cold untreated exhaust gas which enters into the second space 27 through the bypass holes 25.

The exhaust muffler 100 can have an insulating layer not shown which is preferably arranged on the housing wall 12.

It is hereby achieved that the temperature of the housing 12 is kept as low as possible. Aluminum silicate which is a poor heat conductor, can be used as insulating material for example. However, other materials with similar insulating properties can also be used. A double-walled design is also possible.

It will be appreciated by those skilled in the art that the bypass means illustrated in FIGS. 11 and 12 can be applied to any of the exhaust muffler configurations illustrated and described herein. Moreover, the spark arresting cover, apertured pipe or channel, and insulating layer can also be incorporated into any of the embodiments illustrated and described herein.

Although several embodiments have been described in some detail for purposes of illustration, various modifications may be made without departing from the scope and spirit of the invention. Accordingly, the invention is not to be limited, except as by the appended claims.

What is claimed is:

1. An exhaust muffler for an internal combustion engine, comprising:
   a housing;
   an inlet formed in the housing for receiving exhaust gas flowing from the internal combustion engine;
   an outlet formed in the housing for discharging the exhaust gas from the housing;
   a catalyst disposed within the housing between the exhaust gas inlet and outlet;
   a first wall extending outwardly from the housing and defining a generally labyrinth-shaped exhaust outlet channel for directing exhaust gas from the housing outlet to the environment, whereby the flow path of the exhaust gas in the direction of the environment is lengthened; and
   a second wall extending outwardly from the housing in generally spaced relation to the first wall, the second wall defining an ambient air passageway for cooling the exhaust gas passing through the exhaust outlet channel.

2. The exhaust muffler of claim 1, including a cover disposed over the labyrinth-shaped exhaust outlet channel.

3. The exhaust muffler of claim 1, including a cover disposed over the first and second walls, and including an ambient air outlet.

4. The exhaust muffler of claim 1, wherein the first wall includes a plurality of angular bends along a length thereof.

5. The exhaust muffler of claim 4, wherein the angular bends comprise generally ninety-degree bends.

6. The exhaust muffler of claim 1, including means for bypassing a portion of the exhaust gas from the internal combustion engine around the catalyst so as to cool exhaust gas heated by passage through the catalyst.

7. The exhaust muffler of claim 6, including a bypass pipe for passing at least a portion of the exhaust gas flowing out from the internal combustion engine around the catalyst.

8. The exhaust muffler of claim 6, wherein the catalyst is arranged at a dividing wall disposed inside the housing defining a first space and a second space inside the housing, wherein the dividing wall has at least one bypass opening to permit a portion of the exhaust gas to bypass the catalyst and pass from the first space to the second space.

9. The exhaust muffler of claim 2, including an air baffle plate adapted to guide cool air over the cover of the exhaust outlet channel and prevent direct contact with the cover.

10. The exhaust muffler of claim 9, wherein the air baffle plate is comprised of a perforated sheet.

11. The exhaust muffler of claim 1, including a spark arrester screen disposed adjacent to an outlet of the exhaust outlet channel.

12. An exhaust muffler for an internal combustion engine, comprising:
    a housing;
    an inlet formed in the housing for receiving exhaust gas flowing from the internal combustion engine;
    an outlet formed in the housing for discharging the exhaust gas from the housing;
    a catalyst disposed within the housing between the exhaust gas inlet and outlet;
    a first wall extending outwardly from the housing and having a plurality of angular bends along a length thereof to define a generally labyrinth-shaped exhaust outlet channel for directing exhaust gas from the housing outlet to the environment, whereby the flow path of the exhaust gas in the direction of the environment is lengthened;
    a second wall extending outwardly from the housing in generally spaced relation to the first wall, the second wall defining an ambient air passageway for cooling the exhaust gas passing through the exhaust outlet channel; and
    a cover disposed over the exhaust outlet channel.

13. The exhaust muffler of claim 12, including a cover disposed over the first and second walls, and including an ambient air outlet.

14. The exhaust muffler of claim 12, wherein the angular bends comprise generally ninety-degree bends.

15. The exhaust muffler of claim 12, including means for bypassing a portion of the exhaust gas from the internal combustion engine around the catalyst so as to cool exhaust gas heated by passage through the catalyst.

16. An exhaust muffler for an internal combustion engine, comprising:
    a housing;
    an inlet formed in the housing for receiving exhaust gas flowing from the internal combustion engine;
    an outlet formed in the housing for discharging the exhaust gas from the housing;
    a catalyst disposed within the housing between the exhaust gas inlet and outlet;
    a first wall extending outwardly from the housing and having a plurality of angular bends along a length thereof to define a generally labyrinth-shaped exhaust outlet channel for directing exhaust gas from the housing outlet to the environment, whereby the flow path of the exhaust gas in the direction of the environment is lengthened;
    a second wall extending outwardly from the housing in generally spaced relation to the first wall, the second wall defining an ambient air passageway for cooling the exhaust gas passing through the exhaust outlet channel; and
    a cover disposed over the first and second walls, and including an ambient air outlet.

17. The exhaust muffler of claim 16, wherein the angular bends comprise generally ninety-degree bends.

18. The exhaust muffler of claim 16, including means for bypassing a portion of the exhaust gas from the internal combustion engine around the catalyst so as to cool exhaust gas heated by passage through the catalyst.

* * * * *